US012421098B2

(12) United States Patent
Tessicini et al.

(10) Patent No.: US 12,421,098 B2
(45) Date of Patent: Sep. 23, 2025

(54) SYSTEM FOR AUTOMATIC FILLING OF A GLASS AND RELATED PROCESS FOR AUTOMATIC FILLING OF A GLASS

(71) Applicant: FLUID-O-TECH S.R.L., Corsico (IT)

(72) Inventors: Fabrizio Tessicini, Imola (IT); Francesco Butera, Arese (IT); Diego Andreis, Milan (IT); Gianluca Mezzanzanica, Legnano (IT)

(73) Assignee: FLUID-O-TECH S.R.L., Corsico (IT)

( * ) Notice: Subject to any disclaimer, the term of this patent is extended or adjusted under 35 U.S.C. 154(b) by 0 days.

(21) Appl. No.: 18/226,948

(22) Filed: Jul. 27, 2023

(65) Prior Publication Data

US 2024/0034612 A1 Feb. 1, 2024

(30) Foreign Application Priority Data

Aug. 1, 2022 (IT) ........................ 102022000016320

(51) Int. Cl.
*B67D 1/12* (2006.01)
*B67D 1/08* (2006.01)

(52) U.S. Cl.
CPC ......... *B67D 1/1238* (2013.01); *B67D 1/0888* (2013.01)

(58) Field of Classification Search
CPC ............................ B67D 1/1238; B67D 1/0888
(Continued)

(56) References Cited

U.S. PATENT DOCUMENTS 4,944,335 A * 7/1990 Stembridge ........... G01F 23/296 367/908
2016/0177243 A1* 6/2016 Koretz ................ A47J 31/4403 261/130

(Continued)

FOREIGN PATENT DOCUMENTS

WO WO-2012048405 A1 4/2012

OTHER PUBLICATIONS

Search Report and Written Opinion issued Mar. 22, 2023 in Italian Patent Application No. IT202200016320, 7 pages.

*Primary Examiner* — Craig M Schneider
*Assistant Examiner* — Christopher M Afful
(74) *Attorney, Agent, or Firm* — Element IP, PLC

(57) ABSTRACT

The present invention relates to a system (1) for automatic filling of a beverage container (2), comprising a beverage dispensing device (3), adapted, in a use configuration, for dispensing a beverage into a container (2) positioned below said dispensing device (3).
According to the invention, such system (1) comprises at least one optical or ultrasound or radar sensor (4), said sensor (4) being placed in proximity to said dispensing device (3) and presenting a visual field (40); in said use configuration of said system (1), at least a portion of the internal volume (20) of said container (2) and at least a portion of the upper edge (21) of the container (2) fall within said visual field (40) of said sensor (4); said sensor (4) being configured to generate at least a first signal indicative of the distance (Dp) of the free surface (5) of the beverage dispensed by said dispensing device (3) in said internal volume (20) of said container (2) with respect to said sensor (4) and at least a second signal indicative of the distance (Db) of the upper edge (21) of the container (2), said dispensing device (3) being configured to interrupt the dispensing of said
(Continued)

beverage on the basis of said at least at least a first signal and/or said at least a second signal.

6 Claims, 6 Drawing Sheets

(58) Field of Classification Search
USPC .............................................................. 141/1
See application file for complete search history.

(56) References Cited

U.S. PATENT DOCUMENTS

2020/0122995 A1* 4/2020 Chernov ................. G01S 7/481
2021/0078848 A1* 3/2021 Nocchi ............... G06F 18/2413

* cited by examiner

SYSTEM FOR AUTOMATIC FILLING OF A GLASS AND RELATED PROCESS FOR AUTOMATIC FILLING OF A GLASS

The present invention relates to a system for automatic filling of a glass, or a similar beverage container, such as for example a mug, a cup, or a pitcher, as well as a process for automatic filling of a glass.

As known, there are various beverage dispensing systems in which the user, whether being directly the final user, a waiter of a bar or restaurant, or a clerk of a fast-food, places a glass to be filled with a beverage in a dedicated compartment under a dispensing device for such beverage.

Among these beverage dispensing systems, the so-called post-mix dispensing systems which allow to pour a desired carbonated beverage by suitably mixing, when dispensing the beverage, syrups with water and carbon dioxide can be cited.

Nowadays, the most common beverage dispensing systems require the intervention of the user, both to start the dispensing of the beverage, after positioning the glass, and to interrupt the dispensing of the beverage, when the desired filling level is reached. For example, a button to be pressed to activate the dispensing of the beverage, and whose release interrupts the dispensing, can be provided.

Then, there are some more sophisticated dispensing systems comprising a photoelectric sensor, also known as photocell, capable of detecting the presence and absence of a glass in the beverage dispensing compartment. In this case, inserting the glass in the compartment of the dispensing system starts the dispensing itself while removing the glass from the compartment interrupts it. The main drawback of this method consists in that the interruption of the dispensing occurs only when the glass was moved from under the dispenser, and thus there is always a waste of beverage being dispensed on the edge and outside the glass, due to the reaction time of the valve interrupting the dispensing. Furthermore, the intervention of the user is however required to remove the filled glass from the compartment (and from the engaging with the photocell) at the appropriate moment.

Furthermore, there are some beverage dispensing systems that, starting from knowing the dispensing flow rate of the dispensing device, interrupt the dispensing of the beverage after a predetermined period of time. The main drawback of these systems consists in that the capacity of the glass also needs to be known a priori, and thus the type of glass cannot be changed. Furthermore, the dispensing flow rate can differ from device to device and can vary over time. Therefore, repeated and continuous calibrations of the system are required. The possible use of a flow sensor does not overcome the above-mentioned main drawback, and however involves an increase in costs and complexity of the dispensing system.

The primary task of the present invention consists in making a system (and a process) for automatic filling of a glass which overcomes the drawbacks and the limits of the prior art allowing to automatically fill a glass, without intervention of the user.

In the scope of this task, an object of the present invention is to make a system (and a process) for automatic filling of a glass being capable of correctly operating even upon varying the capacity, shape, and type of the glass.

Another object of the invention consists in making a system (and a process) for automatic filling of a glass which is also capable of automatically filling an already partially filled glass.

A further object of the invention consists in making a system (and a process) for automatic filling of a glass being capable of giving the widest guarantees in terms of reliability and safety in use.

Another object of the invention consists in making a system (and a process) for automatic filling of a glass being easy to make and economically competitive if compared to the prior art.

The task set forth above, as well as the mentioned and other objects that will be more evident below, are achieved by a system for automatic filling of a glass and a related process as set forth herein.

Further features are provided in the dependent claims.

Further features and advantages will be more apparent from the description of a preferred, but non-exclusive, embodiment of a system for automatic filling of a glass, illustrated by way of example, and non-limiting, with the aid of the attached drawings in which.

Figure 4:
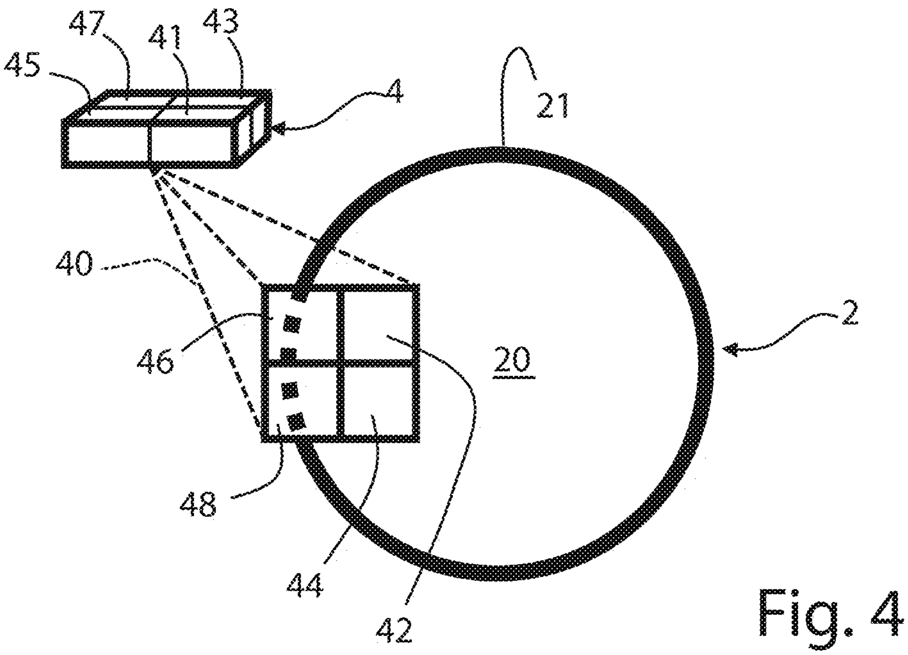
Figure 5:
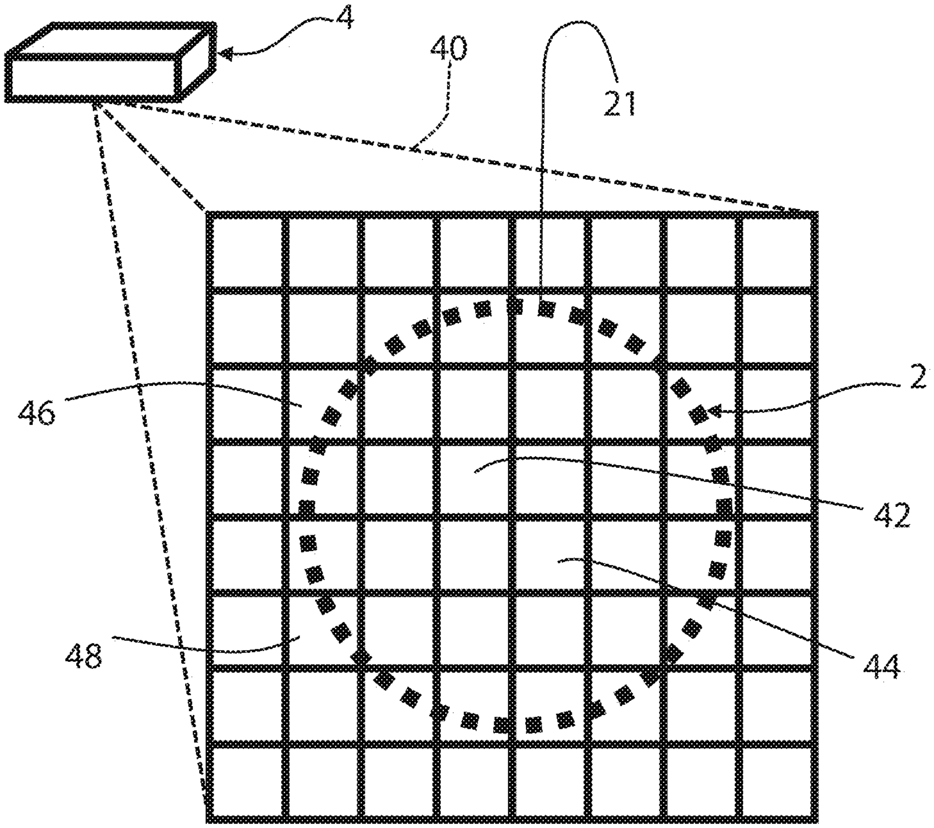
Figure 6:
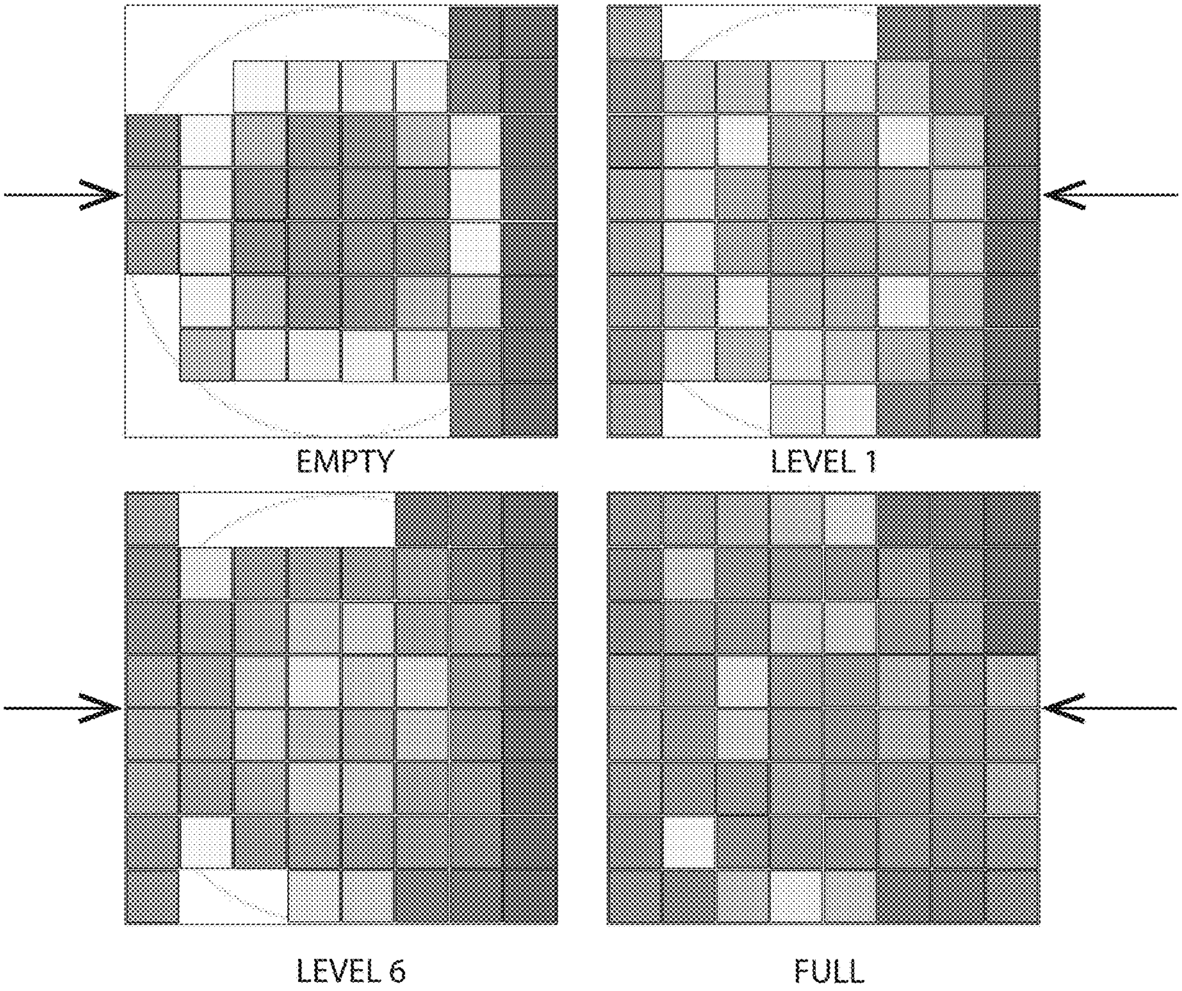
Figure 7:
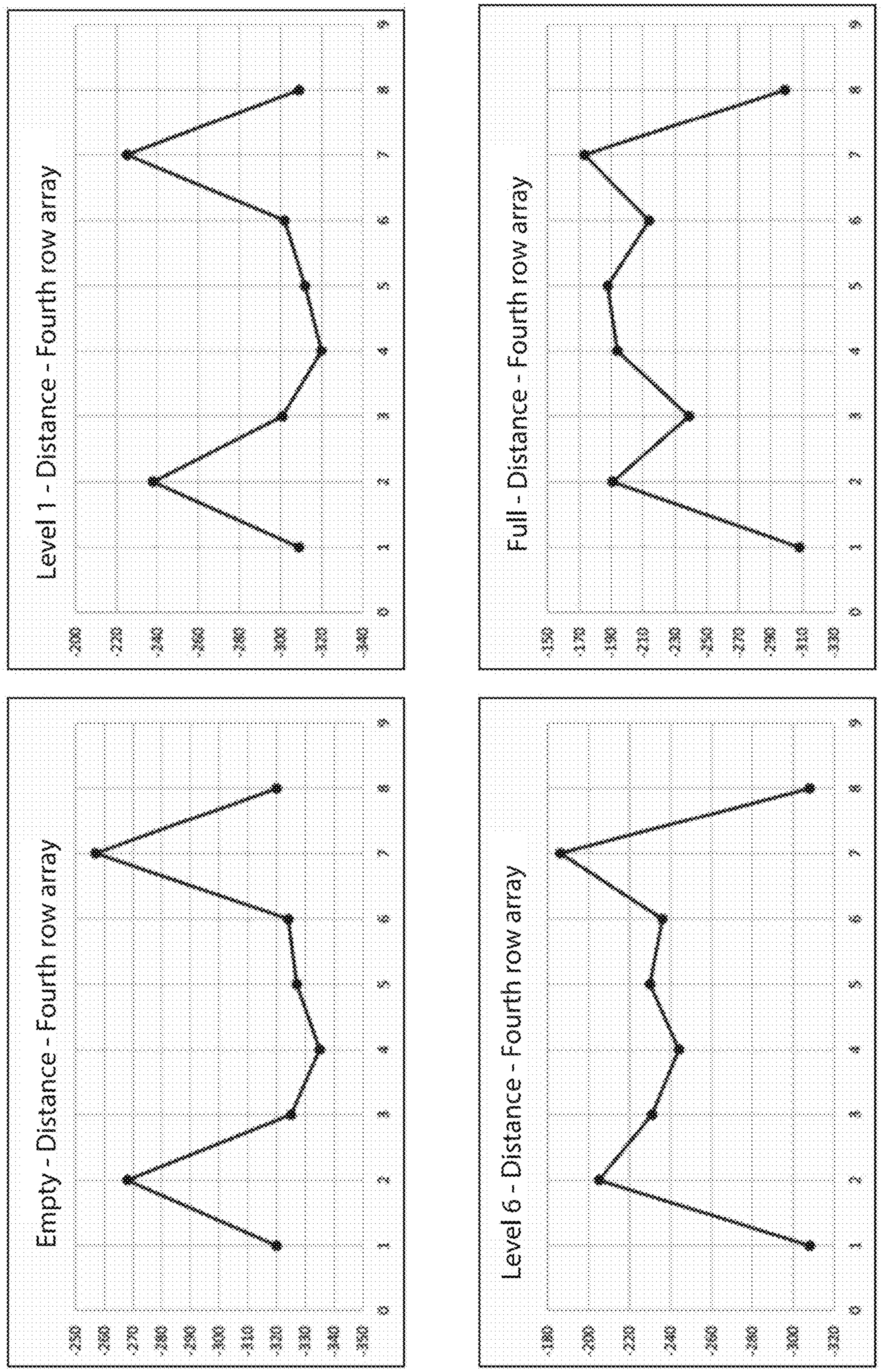
Figure 8:
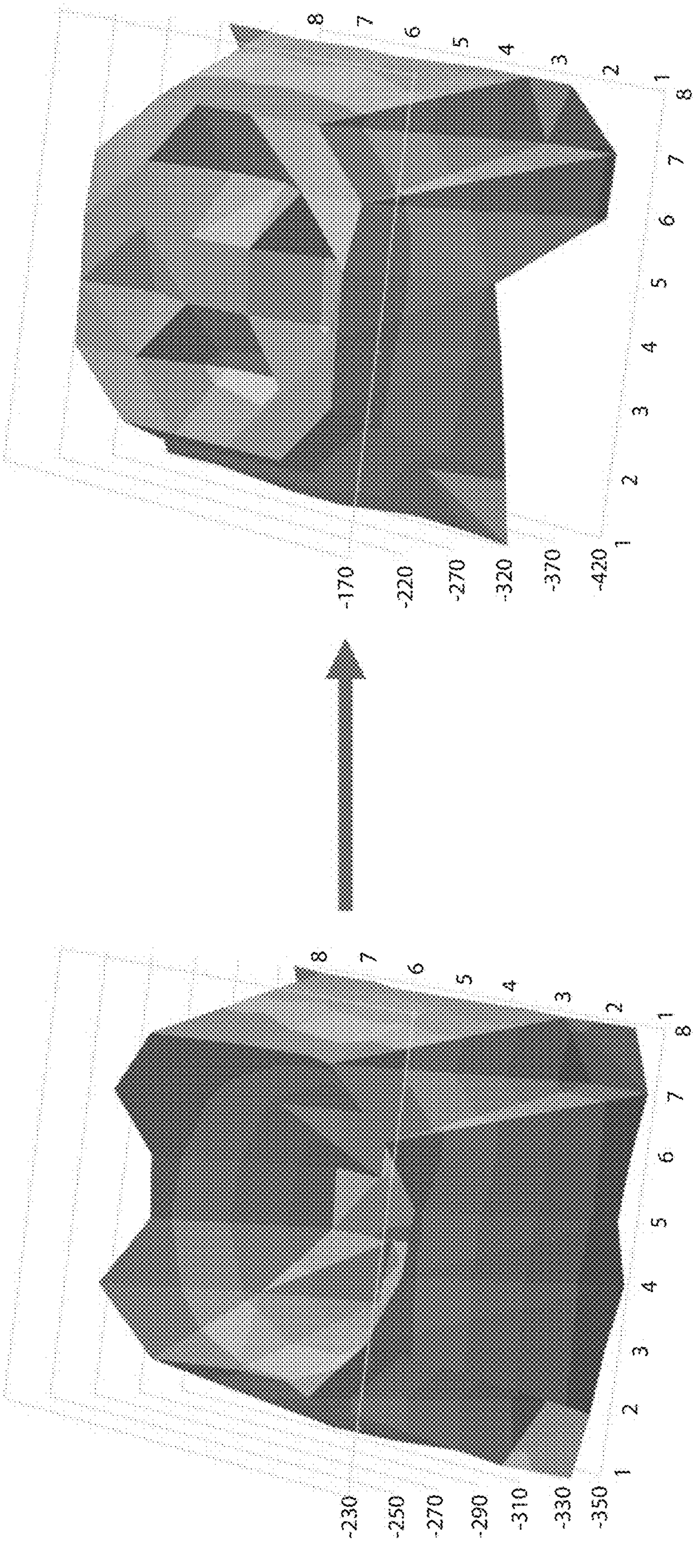
Figure 9:
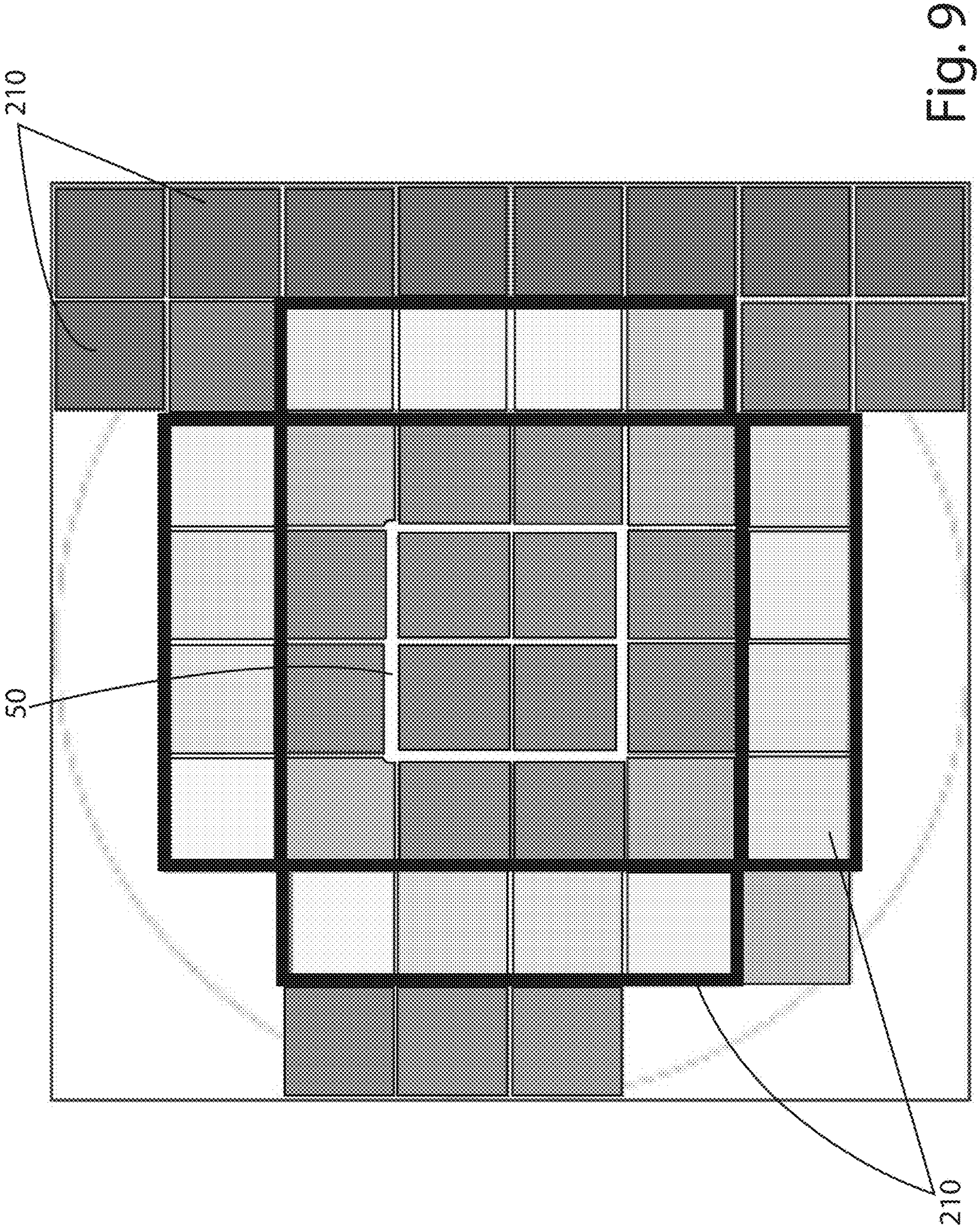

FIG. 4 schematically illustrates a first example of sensor for detecting the filling of the glass;

FIG. 5 schematically illustrates a second example of sensor for detecting the filling of the glass;

FIG. 6 graphically illustrates a signal indicative of the filling of a glass generated by a sensor of the type of that of FIG. 5, in four different conditions: empty glass, glass filled to a first level, glass filled to a second level, full glass;

FIG. 7 reports four graphs related to the four conditions for filling of a glass graphically illustrated in FIG. 6;

FIG. 8 graphically illustrates a three-dimensional reconstruction of the signal indicative of the filling of the glass in two of the four filling conditions graphically illustrated in FIG. 6, and in particular the condition of empty glass and full glass;

FIG. 9 graphically illustrates the signal indicative of the filling of a glass in the first of the four conditions illustrated in FIG. 6 (empty glass), with added annotations.

With reference to the cited figures, the system for automatic filling of a beverage container, overall denoted by reference number 1, comprises a dispensing device 3 adapted, in a use configuration, for dispensing a beverage into a container 2 positioned below the dispensing device 3 itself.

The automatic filling system 1, and more specifically the dispensing device 3, can belong to a system for dispensing beverages such as water, water with added carbon dioxide, or carbonated beverages obtained by mixing syrups with water and carbon dioxide, or still other types of beverages such as alcoholic beverages, or even coffee, milk, cappuccino.

For example, the dispensing device 3 can belong to a so-called post-mix dispensing system.

The container 2 is preferably a glass, but can also be a pitcher, a tankard, or even a mug or a cup.

Preferably, a compartment 30 adapted to house the container 2 so that the container 2 is positioned below the dispensing device 3 itself is associated with the dispensing device 3.

Figure 1:
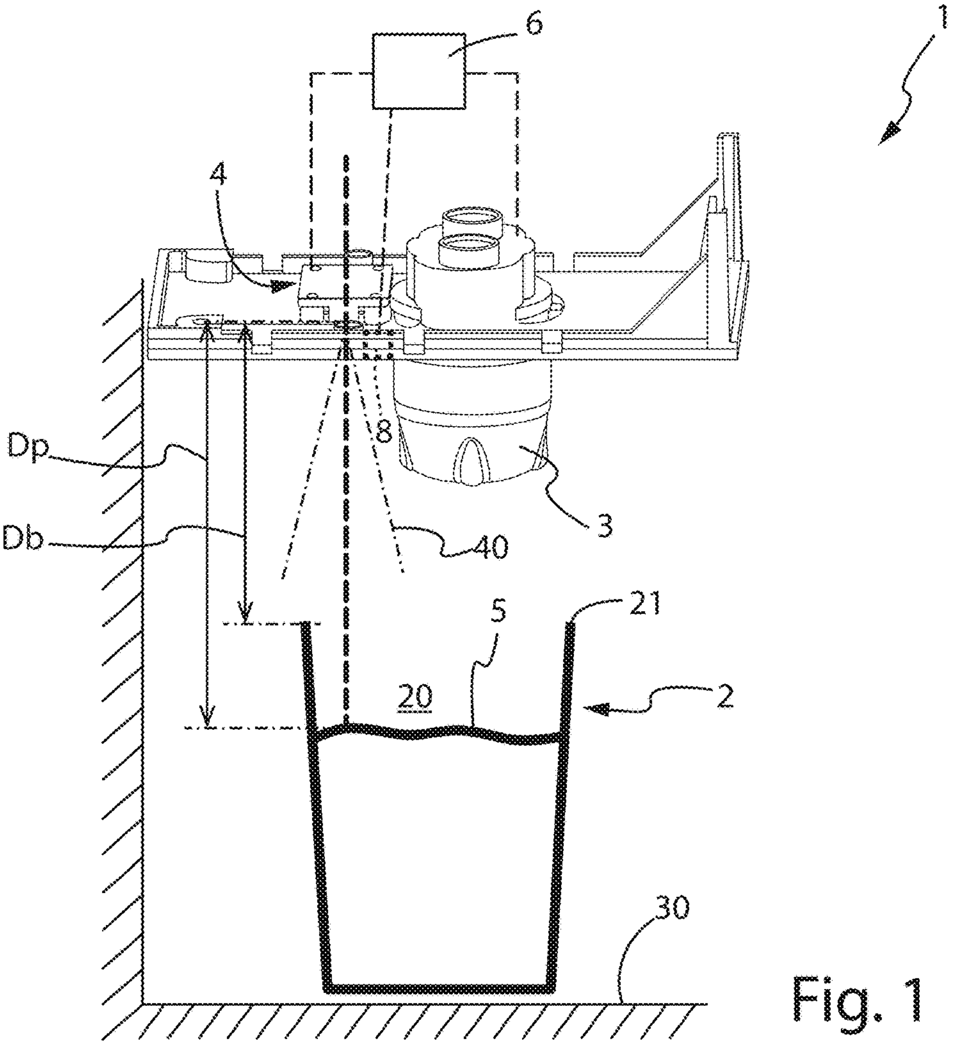
FIG. 1 is a schematic view of an embodiment of a system for automatic filling of a glass, according to the invention.
Figure 2:
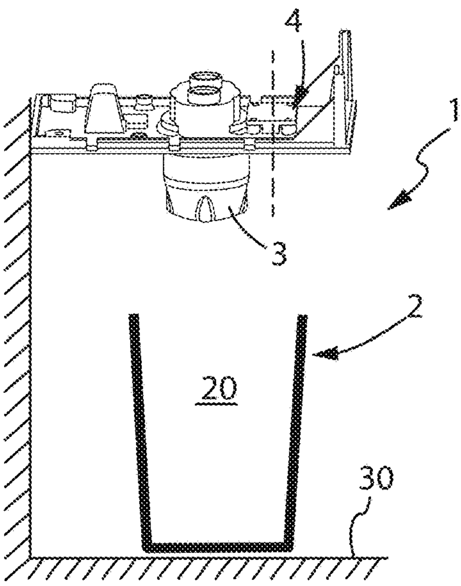
FIGS. 2 and 3 illustrate two variations of the system for automatic filling of a glass of FIG. 1, according to the invention.
Figure 3:
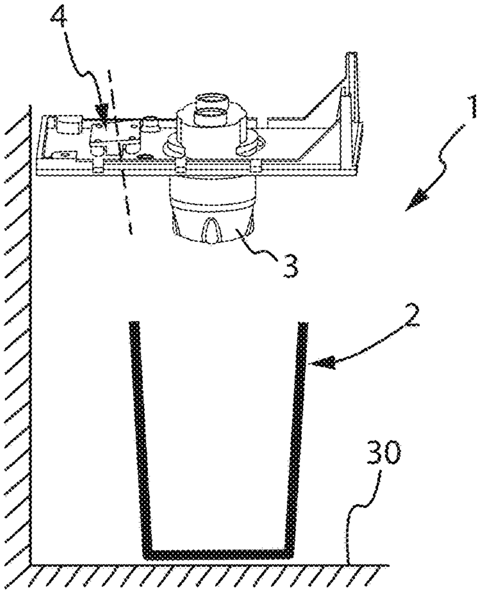

For the sake of simplicity, in FIGS. 1 to 3 a beverage dispensing system in not illustrated as a whole, but only the components belonging to the automatic filling system 1.

According to the invention, the system 1 for automatic filling of a container 2 comprises an optical or ultrasound or radar sensor 4. Such sensor 4 is placed in proximity to the dispensing device 3 and presents its own visual field 40.

In the use configuration of system 1, namely when the container 2 is placed under the dispensing device 3 to receive the dispensed beverage, at least a portion of the internal volume 20 of the container 2 and at least a portion of the upper edge 21 of the container 2 fall within the visual field 40 of the sensor 4.

The sensor 4 is configured to generate at least one of:

at least a first signal indicative of the distance Dp of the free surface 5 of the beverage dispensed by the dispensing device 3 in the internal volume 20 of the container 2, with respect to the sensor 4;

at least a second signal indicative of the distance Db of said at least a portion of the upper edge 21 of the container 2 with respect to the sensor 4.

The dispensing device 3 is configured to interrupt the dispensing of the beverage on the basis of said at least a first signal indicative of the distance Dp of the free surface 5 of the beverage and/or on the basis of said at least a second signal indicative of the distance Db of the upper edge 21 of the container 2.

Essentially, as illustrated by way of example in FIG. 1, the sensor 4 detects the distance Dp of the free surface of the beverage with respect to the sensor 4 itself, and upon reaching a desired distance, corresponding to the desired level of filling of the container 2, the dispensing of the beverage is interrupted. Alternatively, or in combination, the sensor 4 detects the distance Db of the upper edge 21 of the container 2 and recognizes the size thereof, such that the system 1 can interrupt the dispensing of the beverage estimating the correct volume of filling of a container 2 of the identified size.

The sensor 4 is preferably an optical-type sensor, sensible to photons. Alternatively, the sensor 4 can be an ultrasound sensor, or even namely a radar sensor, namely a sensor using electromagnetic waves belonging to the spectrum of the radio waves or microwaves for detecting and determining the position and/or the speed of an object.

Preferably, the sensor 4 is configured to generate both the at least a first signal indicative of the distance Dp of the free surface 5 of the beverage and the at least a second signal indicative of the distance Db of the portion of the upper edge 21 of the container 2 with respect to the sensor 4. In this case, the dispensing device 3 is configured to interrupt the dispensing of the beverage on the basis of both said at least a first signal indicative of the distance Dp of the free surface 5 of the beverage and of said at least a second signal indicative of the distance Db of the upper edge 21 of the container 2.

Preferably, a single sensor 4 capable of generating at least a first signal indicative of the distance Dp of the free surface 5 of the beverage dispensed by the dispensing device 3 and at least a second signal indicative of the distance Db of the upper edge 21 of the container 2 can be provided.

Preferably, the system 1 for automatic filling of a beverage container 2 comprises a processing and control unit 6 in data communication with the dispensing device 3 and with the sensor 4. The processing and control unit 6 is configured to receive, as an input, said at least a first signal indicative of the distance Dp of the free surface 5 of the beverage and said at least a second signal indicative of the distance Db of the upper edge 21 of the container 2 and to process a signal indicative of the difference between the distance Dp of the free surface 5 of the beverage and the distance Db of the upper edge 21 of the container 2.

The processing and control unit 6 is configured to interrupt the dispensing of the beverage on the basis of such signal indicative of the difference between the distance Dp of the free surface 5 of the beverage and the distance Db of the upper edge 21 of the container 2.

In this way, as explained below, the dispensing of the beverage can be interrupted substantially considering the decrease in height difference between the upper edge 21 of the glass 2 and the free surface 5 of the dispensed beverage.

Preferably, the processing and control unit 6 in data communication with the sensor 4 and with the dispensing device 3 is configured to receive, as an input, the second signal indicative of the distance Db of the portion of the upper edge 21 of the container and to generate, on the basis of such signal, a signal indicative of the size of the container 2. The processing and control unit 6 is then further configured to interrupt the dispensing of the beverage on the basis of such signal indicative of the size of the container 2.

In this way, the system 1 identifies the size of the container 2 and the processing and control unit 6 determines when to interrupt the dispensing of the beverage on the basis of the identified size.

This can be advantageously performed by also crossing the information about the size of the container 2 with the information about the effective level of filling of the container 2.

Preferably, the processing and control unit 6 comprises a data memory in which reference parameters of a set of two or more predefined sizes of containers 2 are stored. In this case, the signal indicative of the size of the container 2 is selected within such set of two or more predefined sizes on the basis of the signal indicative of the distance Db of the upper edge 21 of the container 2.

Preferably, the processing and control unit 6 is also configured to generate a signal indicative of the correct positioning of the container 2 under the dispensing device 3, on the basis of said at least a first signal indicative of the distance Dp of the free surface 5 of the beverage and/or on the basis of said at least a second signal indicative of the distance Db of the upper edge 21 of the container 2.

In particular, the processing and control unit 6 is configured to enable the dispensing of the beverage if the signal indicative of the correct positioning of the container 2 is positive and preferably to emit a warning signal to the user if the signal indicative of the correct positioning of the container 2 is negative.

Preferably, the sensor 4 is a sensor comprising at least two sensitive elements 41, 43, 45, 47, each presenting its own visual field 42, 44, 46, 48. At least a portion of the internal volume 20 of the container 2 falls within the visual field 42, 44 of at least a first sensitive element 41, 43 of the sensor 4, and at least a portion of the upper edge 21 of the container 2 falls within the visual field 46, 48 of at least a second sensitive element 45, 47 of the sensor 4.

Preferably, the sensor 4 is a sensor comprising at least four sensitive elements 41, 43, 45, 47, preferably disposed according to a matrix of at least 2×2 sensitive elements.

Preferably, the sensor 4 is a sensor comprising a matrix of at least 4×4 sensitive elements, and even more preferably of 8×8 sensitive elements.

FIG. 4 schematically illustrates an example of a sensor 4 comprising a matrix of 2×2 sensitive elements 41, 43, 45, 47. In such example, the two visual fields 42, 44 of two sensitive elements 41, 43 frame a respective portion of the internal volume 20 of the container 2, while the two visual fields 46, 48 of other two sensitive elements 45, 47 frame a respective portion of the edge 21 of the container 2.

FIG. 5 schematically illustrates an example of a sensor 4 comprising a matrix of 8×8 sensitive elements (not illustrated) with the related sixty-four visual fields associated with each of the sensitive elements, some of which denoted by reference numbers 42, 44, 46, 48.

Preferably, the sensor 4 is configured so that, in the use configuration of the system 1, the entire upper edge 21 of the container 2 falls within the visual field 40 of the sensor 4.

In this way, some sensitive elements frame the internal volume 20 of the container 2, and thus the bottom of the container 2, or the free surface 5 of the beverage as it is being dispensed into the container 2, while other sensitive elements frame the edge 21 of the container. Still other sensitive elements can frame the space of the compartment 30 outside the container 2.

Preferably, the sensor 4 is an optical sensor of the "Time-of-Flight" (ToF) type. Such sensor measures the distance of an object regardless of the reflectivity of the target. Indeed, instead of measuring the distance on the basis of the amount of reflected light, the sensor measures the time it takes light to reach the target and go back (Time-of-Flight).

Preferably, the sensor 4 is an optical sensor of the "Time-of-Flight" (ToF) type comprising a plurality of sensitive elements, preferably disposed according to a squared, rectangular, or other geometrically shaped matrix. Such sensor 4 is capable of defining a depth matrix of how much it falls in its own visual field 40.

Alternatively, the sensor 4 can be an ultrasound or radar sensor, possibly comprising a plurality of sensitive elements, and possibly disposed according to a squared, rectangular, or other geometrically shaped matrix.

According to a further alternative, the sensor 4 can be a camera or video camera.

Preferably, the sensor 4 is configured also to generate at least a signal indicative of the light intensity of the free surface 5 of the beverage dispensed into the container 2 by the dispensing device 3. The processing and control unit 6 is configured to receive, as an input, said at least a signal indicative of the light intensity and to generate a signal indicative of the optical properties of the dispensed beverage. Such signal indicative of the optical properties of the dispensed beverage can be a signal indicative of the variation of the optical properties of the dispensed beverage, at the free surface 5 thereof.

In particular, the processing and control unit 6 is configured to process, on the basis of the signal indicative of the optical properties of the beverage:

- at least a signal indicative of the presence of foam in the dispensed beverage, in particular in the case of carbonated beverage, and/or
- at least a signal indicative of the ratio of water and syrup in the dispensed beverage, in particular in the case of beverage obtained by mixing water and syrup, and/or
- at least a signal indicative of the rheological properties of the foam that is present in the dispensed beverage, such as for example density, viscosity, size of the bubbles, in particular in the case of beverage consisting of coffee, milk and/or cappuccino.

For example, in this way, the processing and control unit 6 can be capable of recognizing that the dispensed beverage is no longer beer, but foam, and thus such unit 6 can generate a warning signal indicative of such variation. The warning signal can for example signal that the beverage is exhausting.

In the case of a dispensing device for beverages obtained by mixing water and syrup, the processing and control unit 6 can be capable of recognizing that the dispensed beverage is watering down and thus can generate a warning signal adapted to indicate that the dispensing device needs to be supplied with syrup.

In the case of a dispensing device for beverages such as coffee, milk, and/or cappuccino, the processing and control unit 6 can be capable of signalling possible undesired variations of the quality of the foam of milk and/or coffee dispensed with the beverage itself.

Preferably, further, the processing and control unit 6 can process the signals of distance Dp of the free surface 5 of the beverage and the signals of distance Db of the edge 21 of the container on the basis of the corresponding signals of light intensity detected by the same sensor 4, in order to optimize them and improve the ability of recognizing the edge 21 of the container with respect to the free surface 5 of the beverage contained therein.

As illustrated in FIG. 1, the sensor 4 can be positioned behind the dispensing device 3, namely in a more internal zone of the compartment 30 than the zone where the dispensing device 3 is placed.

Alternatively, as illustrated in FIG. 2, the sensor 4 can be positioned in front of the dispensing device 3, namely in a more external zone of the compartment 30 than the zone where the dispensing device 3 is placed.

The sensor 4 can be disposed so as to be slightly tilted with respect to a vertical direction, for example by about 5° towards the container 2, as illustrated in the example of FIG. 4.

Preferably, the system 1 also comprises an infrared sensor 8 configured to generate a signal indicative of the temperature in the internal volume 20 of the container 2. The processing and control unit 6 being configured to receive, as an input, also the above-mentioned signal indicative of the temperature.

The presence of ice in the container 2, as well as the presence of ice and beverage, can be recognized by the signal indicative of the temperature of the internal volume 20 of the container 2.

In the case of dispensing the amount of beverage on the basis of the identified size of the container 2, when the information related to the level of effective filling of the container 2 is not present, the beverage dispensing volume in the container 2 can be suitably reduced by a predetermined factor considering that the container 2 already contains ice.

Furthermore, in post-mix dispensing devices, in which syrup and water are mixed just before dispensing the beverage into the container 2, knowing the temperature of the internal volume 20 of the container 2, and thus distinguishing if the container 2 contains ice or not, the ratios of dilution of the syrup can be varied considering the presence of ice that, by liquefying, will tend to water down the beverage.

The present invention also relates to a process for automatic filling of a beverage container 2 comprising the following steps:

a) positioning a beverage container 2 below a beverage dispensing device 3, for example inside a compartment 30 for housing a container (glass) of a beverage dispensing system;

b) starting the dispensing of the beverage into the container 2;

c) generating, by means of at least one optical or ultrasound or radar sensor 4, at least one of (i) at least a first signal indicative of the distance Dp of the free surface 5 of the beverage dispensed by the dispensing device 3 in the internal volume 20 of the container 2, with respect to the sensor 4 itself and (ii) at least a second signal indicative of the distance Db of at least a portion of the upper edge 21 of the container 2 with respect to the sensor 4;

d) interrupting the dispensing of the beverage on the basis of said at least a first signal indicative of the distance Dp of the free surface 5 of the beverage and/or on the basis of said at least a second signal indicative of the distance Db of the upper edge 21 of the container 2.

Advantageously, in this way, the dispensing of the beverage by the dispensing device 3 can be interrupted on the basis of the increase of the level of filling of the container 2 and/or on the basis of the size of the container 2.

Preferably, the process comprises the following steps of:

c1) generating, by means of at least one sensor 4, both said at least a first signal indicative of the distance Dp of the free surface 5 of the beverage and said at least a second signal indicative of the distance Db of at least a portion of the upper edge 21 of the container 2 with respect to the sensor 4;

d1) interrupting the dispensing of the beverage on the basis of both said at least a first signal indicative of the distance Dp of the free surface 5 of the beverage and of said at least a second signal indicative of the distance Db of the upper edge 21 of the container 2.

As mentioned above, a same sensor 4 can be adapted to generate both the first and the second signal.

The fact of also knowing the distance Db of the upper edge 21 of the container 2 with respect to the sensor 4 advantageously allows to interrupt the dispensing of the beverage also considering, in addition to the level of filling of the container 2, the level of maximum filling of the container, corresponding, to the maximum, to the level of the edge 21 of the container 2 itself.

Preferably, the process also comprises the following steps:

c2) processing a signal indicative of the difference between the distance Dp of the free surface 5 of the beverage and the distance Db of the upper edge 21 of the container 2, for example by means of a processing and control unit 6;

d2) interrupting the dispensing of the beverage on the basis of said signal indicative of the difference between the distance Dp of the free surface 5 of the beverage and the distance Db of the upper edge 21 of the container 2.

Advantageously, in this way, the dispensing of the beverage can be interrupted considering how much the free surface 5 of the beverage is approaching the edge 21 of the container 2. Indeed, it has been observed that, while the absolute values of the distance Dp of the free surface 5 of the beverage and of the distance Db of the upper edge 21 of the container 2 float during the filling of the container 2 itself, as a result of the reflections generated by the reflecting surface of the beverage whose level is increasing, the value of the difference between such two distances Dp and Db is a more solid and repeatable indicator of the effective level of filling of the container 2 itself.

Preferably, the sensor 4 is a sensor comprising a plurality of sensitive elements 41, 43, 45, 47 adapted to generate a first signal indicative of the distance Dp of the free surface 5 of the beverage (or of the bottom of the container 2 if there is no beverage yet) or a second signal indicative of the distance Db of the upper edge 21 of the container 2, depending on where the respective visual field 42, 44, 46, 48 falls. In the case where the visual field of the sensitive element falls outside the container 2, the respective sensitive element is adapted to generate a signal that is neither indicative of the distance Dp, nor of the distance Db, but, for example, indicative of the distance of the sensor 4 from the bottom of the compartment 3.

Preferably, the process comprises the steps of:

e) associating the signal generated by each of the sensitive elements 41, 43, 45, 47 composing the sensor 4 to the internal volume 20 of the container 2, namely to the free surface 5 of the beverage dispensed into the container 2 (or to the bottom of the container 2 as long as it is empty) or to the upper edge 21 of the container 2 or neither to one, nor the other if the visual field of the respective sensitive element falls totally outside the container 2;

f) processing a signal indicative of the average value of a plurality of the signals generated by the sensitive elements 41, 43 associated with the internal volume 20 of the container 2;

g) processing a signal indicative of the average value of a plurality of the signals generated by the sensitive elements 45, 47 associated with the upper edge 21 of the container 2;

h) interrupting the dispensing of the beverage on the basis of the difference between said signal indicative of the average value of the signals generated by the sensitive elements 41, 43 associated with the internal volume 20 of the container 2 and said signal indicative of the average value of the signals generated by the sensitive elements 45, 47 associated with the upper edge 21 of the container 2.

In this way, the signal generated by each of the sensitive elements 41, 43, 45, 47 is associated with the edge 21 of the container 2 or the internal volume 20 of the container 2 or the volume external to the container 2, depending on where the respective visual field 42, 44, 46, 48 falls, and the average value among some of the, or preferably among all the, sensitive elements associated with the free surface 5 of the beverage and the average value among some of the, or preferably among all the, sensitive elements associated with the edge 21 of the container are calculated.

Preferably, such step of associating some sensitive elements to the edge 21 of the container 2 and others to the internal volume 20 is made on the basis of the signal detected by the sensor 4 when the container 2 is placed under the sensor 4 itself, namely in the compartment 30, before starting the dispensing of the beverage, namely when the container 2 is empty.

Preferably, the process further comprises the step of starting the dispensing of the beverage, by means of activating the dispensing device 3, on the basis of the at least a first signal indicative of the distance Dp of the free surface 5 of the beverage dispensed by the dispensing device 3 in the internal volume 20 of the container 2 with respect to the sensor 4. In other words, the sensor 4 can be further used to recognize the presence of a container 2 in the compartment 30 of the system for dispensing the beverage, and to start the dispensing on the basis of such recognizing.

The operation of the system for automatic filling of a beverage container and the related process is further described below with the aid of FIGS. 6 to 9.

For example, FIG. 6 graphically reports the signal generated by an optical-type sensor 4 comprising a matrix of 8×8 sensitive elements, in four different conditions of filling of the container 2: empty container on the top left, container filled to a first level, on the top right, container filled to a second level higher than the first, on the bottom left and full container on the bottom right.

FIG. 7 reports instead the graphs related to the numerical values of distance detected by the sensitive elements of the fourth row of the 8×8 matrix, denoted by the black arrows in FIG. 6, in the same four conditions of FIG. 6.

In FIG. 6, a different shade of grey corresponds to a different distance Dp or Db detected by the respective sensitive element.

In the example of FIG. 6, the entire upper edge 21 of the container 2 falls in the visual field 40 of the sensor 4.

In the condition of empty container, indeed, it can be noted in FIG. 6 that the signals generated at the edges of the container 2 have a lighter shade of grey than the centre of the container, as they are at a shorter distance with respect to the sensor 4. In the same condition of empty container, in FIG. 7, it can be noted that the numerical values of distance show a particular "horn" profile since the sensitive elements at the opposite sides of the upper edge 21 of the container 2 detect a distance Db shorter than the distance Dp detected by the sensitive elements at the internal volume 20 of the container 2.

As the container 2 is being filled, the difference between the distance Dp and the distance Db is reduced. In the condition of full container, the signals generated by the sensitive elements at the edges 21 of the container 2 get to equal those generated by the sensitive elements at the internal volume 20 of the container 2. Indeed, a same shade of grey at both the edge 21 and the internal volume 20 of the container 2 can be noted in FIG. 6.

Similarly, in the graph of FIG. 7 corresponding to the condition of full container, on the bottom right, the "horn" profile has become a "plateau" profile.

FIG. 8 represents two three-dimensional graphic reconstructions of the signals detected by the sensitive elements of the sensor 4 respectively in the condition of empty container, on the left, and of full container, on the right. The shape of the empty glass on the left and of the filled glass on the right can be recognized.

FIG. 9 illustrates again the example of signal generated by an optical-type sensor 4, comprising a matrix of 8×8 sensitive elements, in a condition of empty container. In such figure, the signals of the sensitive elements which are associated with the internal volume of the container 2 are denoted by 50, and the signals of the sensitive elements which are associated with the upper edge 21 of the container 2 by number 210.

As explained above, the process for automatic filling of a beverage container can provide the step of calculating the average value of the distances Dp detected by the sensitive elements 41, 43 associated with the free surface 5 of the beverage in the container 2 and the average value of the distances Db detected by the sensitive elements 45, 47 associated with the upper edge 21 of the container 2. Such process further comprises the step of interrupting the dispensing of the beverage by the dispensing device 3 on the basis of the difference of the two average values thus calculated.

For example, a sub-matrix of 2×2 central sensitive elements of the 8×8 matrix can be associated with the internal volume 20 of the container 2, and thus to the free surface 5 of the beverage dispensed therein.

Depending on the size and the shape of the container 2, some peripheral sensitive elements can be instead associated with the edge 21 of the container 2. In the example of FIG. 9, four central sensitive elements of the second and seventh rows of the 8×8 matrix and four central sensitive elements of the second and seventh columns of the 8×8 matrix are associated with the upper edge 21 of the container 2.

For the same used sensor 4, upon varying the size and the shape of the container 2, as well as upon varying the positioning of the container 2 inside the compartment 30, under the sensor 4 itself, different sensitive elements can be associated with the internal volume 20 of the container 2 and to the upper edge 21 of the container 2.

Such association can be made by the processing and control unit 6 on the basis of the signal detected by the sensor 4 once positioned the container 2 in the compartment 30 just before starting the dispensing of the beverage.

Finally, the present invention also relates to a beverage dispensing system comprising a system 1 for automatic filling of a container 2 as described above.

It was practically found that the system and the process for automatic filling of a beverage container, according to the present invention, fulfil the task as well as the prefixed objects as they allow a beverage container to be automatically, easily, and accurately filled, avoiding a waste of beverage.

Another advantage of the system and the process, according to the invention, consists in correctly operating even upon varying the capacity, the shape, and the type of container, adapting to the circumstances.

A further advantage of the system and the process, according to the invention, consists in filling also an already partially filled glass.

Another advantage of the system and the process, according to the invention, consists in adapting to any type of beverage dispensing device, both post-mix and not.

A further advantage of the system and the process, according to the invention, consists in that the dispensing of beverage into the container can be automatically started and interrupted.

The system and the process for automatic filling of a beverage container thus conceived is susceptible of a number of modifications and variations, all falling within the scope of the inventive concept.

Furthermore, all the details can be replaced by other technically equivalent elements.

In practice, the employed materials, as long as compatible with the specific use, as well as the contingent shapes and size, can be any depending on the requirements.

The invention claimed is:

1. A process for automatic filling of a beverage container, comprising:

positioning a beverage container below a beverage dispensing device;

starting the dispensing of said beverage into said container;

generating, by at least one optical or ultrasound or radar sensor comprising a plurality of sensitive elements, (i) at least a first signal indicative of the distance (Dp) of the free surface of the beverage dispensed by said dispensing device in the internal volume of said container with respect to said sensor and (ii) at least a second signal indicative of the distance (Db) of said at least a portion of the upper edge of said container with respect to said sensor;

associating the signal generated by each of said sensitive elements to the internal volume of said container or to the upper edge of said container or to none of said internal volume and said upper edge of said container;

processing a signal indicative of the average value of a plurality of signals generated by said sensitive elements associated with said internal volume of said container;

processing a signal indicative of the average value of a plurality of signals generated by said sensitive elements associated with said upper edge of said container; and interrupting the dispensing of said beverage on the basis of the difference between said signal indicative of the average value of the signals generated by said sensitive elements associated with said internal volume of said container and said signal indicative of the average value of the signals generated by said sensitive elements associated with said upper edge of said container.

2. The process for automatic filling of a beverage container according to claim 1, wherein said sensor is a sensor comprising at least two sensitive elements, each of said sensitive elements having its own visual field, at least a portion of the internal volume of said container falling within the visual field of at least a first sensitive element of said sensor, at least a portion of the upper edge of said container falling inside the visual field of at least a second sensitive element of said sensor.

3. The process for automatic filling of a beverage container according to claim 1, wherein said sensor is a sensor comprising a matrix of at least 2×2 sensitive elements.

4. The process for automatic filling of a beverage container according to claim 1, wherein said sensor is configured so that the entire upper edge of said container falls within the visual field of said sensor.

5. The process according to claim 1, further comprising:

processing a signal indicative of the difference between said distance (Dp) of the free surface of the beverage and said distance (Db) of the upper edge of said container; and interrupting the dispensing of said beverage on the basis of said signal indicative of the difference between said distance (Dp) of the free surface of the beverage and said distance (Db) of the upper edge of said container.

6. The process according to claim 1, wherein said associating the signal generated by each of said sensitive elements to said internal volume of said container or to said upper edge of said container or none of said internal volume and said upper edge of said container is made on the basis of the signal detected by said sensor when said container is placed under said sensor before the starting of the dispensing of the beverage.

* * * * *